Patented Oct. 20, 1931

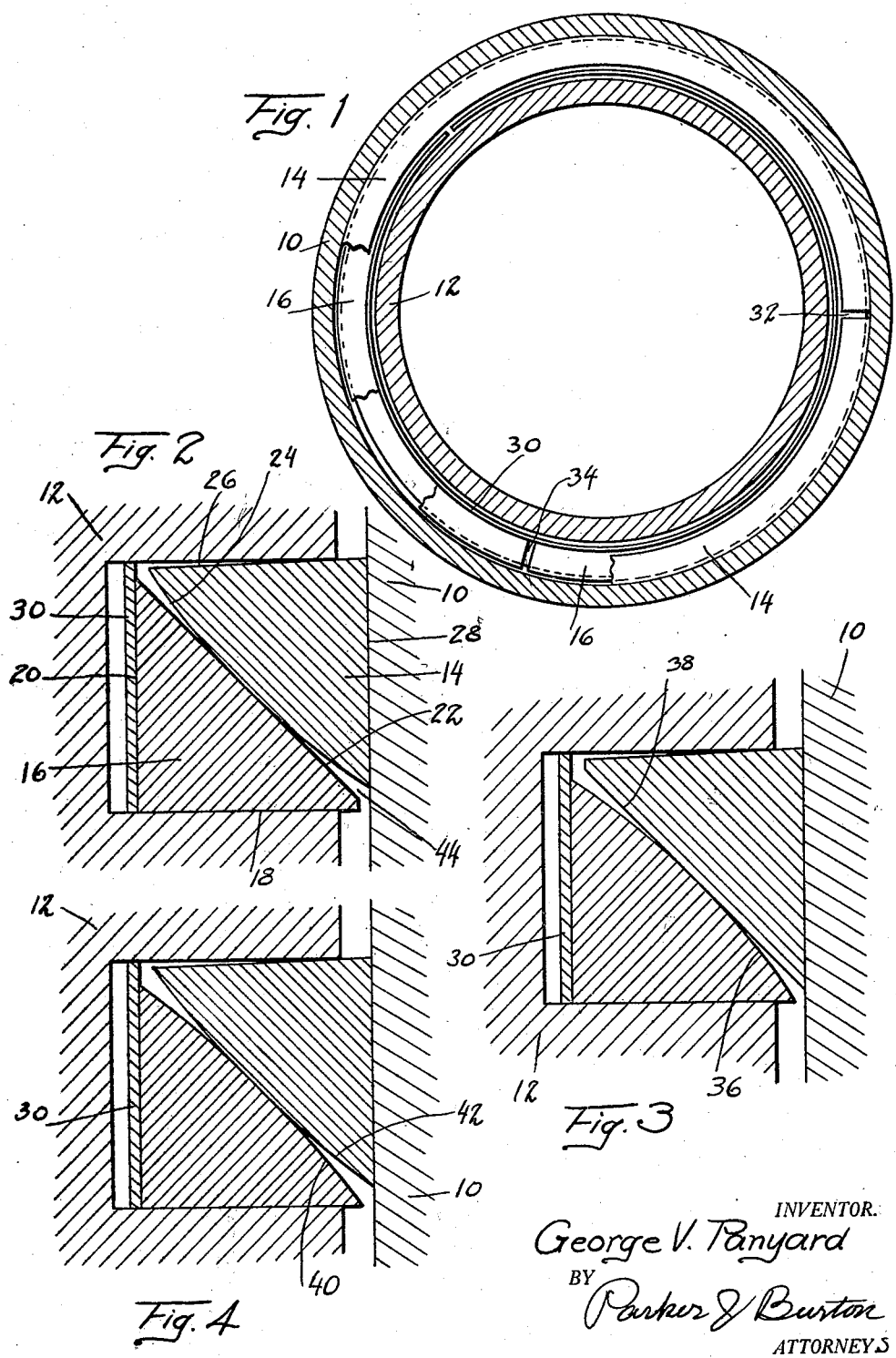

1,827,903

UNITED STATES PATENT OFFICE

GEORGE V. PANYARD, OF MUSKEGON, MICHIGAN

PISTON PACKING

Application filed January 15, 1930. Serial No. 420,829.

My invention relates to piston packing and has particular reference to that specie which is commonly termed a piston ring and is utilized in conjunction with the pistons of internal combustion engines.

An object is to provide piston packing of such a character that it will function automatically during the reciprocation of the piston in the cylinder to take up for wear, which will effectively serve to seal the joint formed with the side walls of the packing groove in the piston, as well as the wall of the cylinder.

Still another object is to so correlate the elements comprising my piston packing that the assembly as a whole is deformable and thus prevent the possibility of the packing "freezing" in the groove and thereby failing to function properly.

More specifically, I provide a plurality of split cooperative ring sections which are held outwardly against the side walls, or lands, of the groove by a suitable spring seated in the groove of the piston. By so correlating these split ring sections that the one is rockable with respect to the other I have provided a piston ring assembly which seats equally well against the cylinder wall and the groove lands, regardless of whether said groove lands and cylinder walls form a true 90 degree angle or not.

Still other objects and meritorious features of my invention will become apparent from the following description taken in conjunction with the drawings wherein like numerals refer to like parts throughout the several figures and wherein:

Fig. 1 is a top plan view of a single cylinder embodying my piston packing assembly seated in the groove of a conventional piston, Fig. 2 is an enlarged vertical section of the assembly, and Figs. 3 and 4 are sectional elevations of modified forms.

In Fig. 1 the numeral 10 represents the cylinder wall of a conventional internal combustion engine, in which is mounted for reciprocating movement the piston 12.

My packing, or piston ring assembly, is composed of a plurality of split ring sections 14 and 16, each of which is substantially triangular in cross section.

In my preferred embodiment as illustrated in Fig. 2 it will be noted that the lower triangular section 16 is substantially of a right triangular shape. The two legs thereof, 18 and 20, form a right angle while the hypotenuse 22 is a straight edge.

On the other hand, it will be noted that the upper triangular section 14 differs from the other section in several respects. The hypotenuse 24 of this upper section is somewhat curved for the purpose of permitting it to rock upon the straight edge hypotenuse 22. Each of the legs 26 and 28 of the upper section 14 is a straight edge, but it will be noted that the apex angle between the two legs 28 and 26 is slightly less than a right angle.

A follower spring 30 is seated in the piston groove and normally tends to urge the lower section 16 outwardly in a radial direction with respect to the piston. However, inasmuch as the upper section 14 is free to rock upon the straight edge hypotenuse 22 of the lower section 16, this aforesaid outward radial force is divided into a plurality of component forces, one of which tends to urge the upper section 14 against the side wall of the cylinder 10, the other of which tends to urge the section 14 upwardly against the upper land groove of the piston.

As already stated, each of the triangular ring sections is split at some point on its circumference, as clearly indicated at 32 and 34 in Fig. 1.

By virtue of the fact that the apex angle of the upper triangle section 14 is less than a right angle it is immaterial whether or not the upper land groove of the piston forms a true right angle with the cylinder wall 10 or not. The upper section being free to rock about its relatively fixed lower section, it will conform to any slight deviation from the true right angle which may exist between the said land groove and cylinder wall.

In Figs. 3 and 4 I have illustrated various modifications of my preferred structure. In Fig. 3 it will be noted that the hypotenuse 36 of the lower section is curved and that the hypotenuse 38 of the upper section constitutes a straight edge. This is simply a reverse of the structure shown in Fig. 2 and the operation of the two members with respect to one another is obviously the same. In Fig. 4 each of the hypotenuses 40 and 42 are curved.

It will be noted that this adaptability of my ring assembly to conform to varying angles between the cylinder wall and the piston groove lands removes the necessity of running in the engine for a considerable period of time with the greatest degree of care, because the ring is free to flex and seat immediately in the contours of the piston and cylinder walls.

All possibility of the ring sticking or "freezing" in the piston groove is also eliminated by making the ring assembly deformable as a whole.

It is also to be noted that the open spaces between the two sections creates an oil pocket 44 which functions to maintain a cylinder wall lubricator at all times, thereby preventing a dry or squeaky motor.

Of course, this oil pocket 44 occurs on the lower, or downward, side of the assembly only. A tight joint is essential between the piston ring and the upper land groove in order to maintain high compression in the upper part of the cylinder.

Various other modifications may be apparent to those skilled in the art, and for that reason I intend to limit myself only within the scope of the appended claims.

I claim:

1. In piston packing, a piston having a groove for packing, and a pair of cooperating generally triangular split ring sections mounted within said groove forming in combination a ring substantially rectangular in cross section, said sections having angular meeting faces formed on dissimilar angles arranged along a diagonal of said rectangle and engaged only at about the center of the ring whereby one section is rockably supported upon the other within the groove.

2. In piston packing, a piston having a groove for packing, a pair of cooperating split ring sections mounted within said groove having angular meeting faces formed on dissimilar angles and engaged along a line substantially midway their inner and outer edges only whereby one section is rockably supported upon the other within the groove.

3. In piston packing, a piston having a groove for packing, and a pair of cooperating split ring sections mounted within said groove, one ring section having a beveled face contacting an arcuate face formed on the other ring section.

4. In piston packing, a piston having a groove for packing, and a pair of cooperating generally triangular split ring sections mounted within said groove forming in combination a ring substantially rectangular in cross section, said ring sections having contacting faces rockably engaged only along a line intermediate their inner and outer edges and spaced apart adjacent both said edges.

5. Piston packing comprising a plurality of concentric split rings having adjacent peripheral edge surfaces in rockable contact with one another, each ring being of substantially triangular cross section, the rockable contacting face of one ring section against the other being curved, and means for exerting outward pressure upon said packing.

6. Piston packing comprising a plurality of concentric split rings forming a substantial rectangle in cross section, each ring being substantially triangular in cross section, said rings contacting along the diagonal of the rectangle at a single intermediate point only and being spaced apart at said diagonal adjacent the cylinder wall engaging faces.

7. A piston packing comprising two substantially right triangular ring sections having their hypotenuses in opposed contacting relation, one of said hypotenuses being slightly curved to permit rocking motion with respect to the other.

8. A piston packing comprising two substantially right triangular ring sections having their hypotenuses in opposed contacting relation, one of said hypotenuses being slightly curved, the apex of the outer ring being slightly less than 90 degrees.

9. A piston packing comprising two substantially right triangular ring sections having their hypotenuses in opposed contacting relation, one of said hypotenuses being slightly curved, the apex angle of the outer ring being slightly less than 90 degrees, and means normally urging the packing assembly outwardly.

10. In combination with a piston having a peripheral groove, a packing within said groove comprising an outer and inner ring substantially triangular in cross section with this hypotenuse in opposed contacting relation and rockable with respect to each other, the apex angle of the outer ring being slightly less than 90 degrees and one leg thereof being adapted to seat against a cylinder wall, the adjacent leg of the inner ring being adapted to seat against one land of the peripheral groove.

In testimony whereof, I, GEORGE V. PANYARD, sign this specification.

GEORGE V. PANYARD.